(12) United States Patent
Klink et al.

(10) Patent No.: US 11,386,380 B2
(45) Date of Patent: Jul. 12, 2022

(54) SYSTEM AND METHOD FOR VISUAL, ARTIFICIAL INTELLIGENCE, AND RULE BASED QUALITY ASSURANCE

(71) Applicant: salesforce.com, inc., San Francisco, CA (US)

(72) Inventors: Tamara Klink, Melbourne (AU); Anna Hodge, Melbourne (AU); Jsun Pe, Point Cook (AU); Jerry Huang, Melbourne (AU)

(73) Assignee: salesforce.com, inc., San Francisco, CA (US)

( * ) Notice: Subject to any disclaimer, the term of this patent is extended or adjusted under 35 U.S.C. 154(b) by 184 days.

(21) Appl. No.: 16/262,101

(22) Filed: Jan. 30, 2019

(65) Prior Publication Data

US 2020/0242534 A1  Jul. 30, 2020

(51) Int. Cl.

| | |
|---|---|
| *G06Q 10/06* | (2012.01) |
| *G06F 3/04817* | (2022.01) |
| *G06F 3/0482* | (2013.01) |
| *G06N 5/04* | (2006.01) |
| *G06T 7/00* | (2017.01) |
| *G06F 40/20* | (2020.01) |

(52) U.S. Cl.
CPC ..... *G06Q 10/06395* (2013.01); *G06F 3/0482* (2013.01); *G06F 3/04817* (2013.01); *G06N 5/046* (2013.01); *G06F 40/20* (2020.01); *G06T 7/0002* (2013.01); *G06T 2207/20081* (2013.01)

(58) Field of Classification Search
CPC ....................................................... G06Q 10/06
USPC ........................................................ 705/7.41
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Nga B Nguyen
(74) *Attorney, Agent, or Firm* — LKGlobal | Lorenz & Kopf, LLP (57) ABSTRACT

A quality assurance (QA) system for automatically performing a quality assurance check on digital communication is configured to: receive a digital communication from an executing application on an external computing device; retrieve a predetermined set of rules applicable to the digital communication; and perform a QA check on the digital communication by determining whether the digital communication complies with each rule in the predetermined set of rules. The set of predetermined rules includes non-visual (e.g., textual and user-selected form fields) rules and vision-based rules. The non-visual rules include a rule requiring the inclusion of specific text or a rule requiring the exclusion of specific text. The visual-based rules include a rule identifying a specific graphical item to be included in or excluded from the digital communication. The QA system is further configured to generate a GUI that provides a visual indication of each rule not met.

20 Claims, 7 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,178,842 B2 * | 11/2015 | Pamidiparthi ........ G06F 40/151 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0250497 A1 * | 9/2010 | Redlich ............... H04L 63/0227 707/661 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0033283 A1 * | 1/2015 | Mulder ............... H04L 63/0245 726/1 |
| 2015/0256545 A1 * | 9/2015 | Dotterer, III ............ H04L 63/20 726/1 |
| 2016/0294753 A1 * | 10/2016 | Centner .................. H04L 51/12 |
| 2016/0330084 A1 * | 11/2016 | Hunter .................... H04L 12/18 |
| 2017/0041296 A1 * | 2/2017 | Ford .................... G06F 16/951 |
| 2017/0237857 A1 * | 8/2017 | Cordell ............... H04M 3/5125 379/265.06 |
| 2017/0372170 A1 * | 12/2017 | Young .................... G06K 9/6263 |
| 2018/0341670 A1 * | 11/2018 | Young .................... G06T 11/60 |

(56) References Cited

U.S. PATENT DOCUMENTS

2019/0109824 A1* 4/2019 Keini ................. H04Q 9/02
2020/0057951 A1* 2/2020 Soni .................. G06F 16/36
2020/0065397 A1* 2/2020 Goenka ............... G06F 16/13

* cited by examiner

SYSTEM AND METHOD FOR VISUAL, ARTIFICIAL INTELLIGENCE, AND RULE BASED QUALITY ASSURANCE

TECHNICAL FIELD

Embodiments of the subject matter described herein relate generally to quality assurance systems, and more particularly to quality assurance systems and methods for performing visual-based, artificial intelligence-based, and rule-based quality assurance on outgoing communications.

BACKGROUND

When outgoing communications are sent out, such as in mass marketing campaigns, it is desirable that the outgoing communications not contain errors. Errors in outgoing communications can result in the violation of rules and regulations (e.g., failure to provide an unsubscribe link for outgoing email communications) and ultimately in the issuance of fines. Errors in outgoing communications can also result in reduced brand reputation. Consequently, checklists may be used by marketing professionals to identify checks to be manually performed prior to sending out outgoing communications. A number of different checklists may be used for each communication and performance of the checks identified by the checklists may be time intensive.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

The subject matter described herein discloses apparatus, systems, techniques and articles for an automated QA (quality assurance) tool that is configurable by non-technical users (e.g., non-technical business users) to detect different types of errors on outgoing communications (e.g., campaign communications), and if necessary, prevent the outgoing communications from being sent until those errors are corrected. Use of the QA tool can, in some example implementations, shorten the QA process from hours to seconds and, to ensure a higher level of deployment accuracy, remove the human-error element by up to 90%. The apparatus, systems, techniques and articles described herein may be directly integrated into various cloud services that have communication facilities (e.g., the Salesforce Marketing Cloud, Sales Cloud, Service Cloud, Platform, Commerce Cloud, and others), as well as other systems that have communication facilities. The apparatus, systems, techniques and articles described herein may be applied to different outgoing communication modalities such as email, SMS, hard printed mail that is snail-mail delivered, and others.

The apparatus, systems, techniques and articles described herein may provide an easy, configurable solution to adopt global best practices for outgoing communication. The apparatus, systems, techniques and articles described herein may provide users with peace of mind that their communications are error-free, their brand reputation is preserved, whilst saving valuable resource time better spent on more strategic initiatives. The apparatus, systems, techniques and articles described herein can automate otherwise tedious, compliance-related work, reduce the level of more mundane tasks, and can free resources to focus on higher value tasks.

Figure 1:
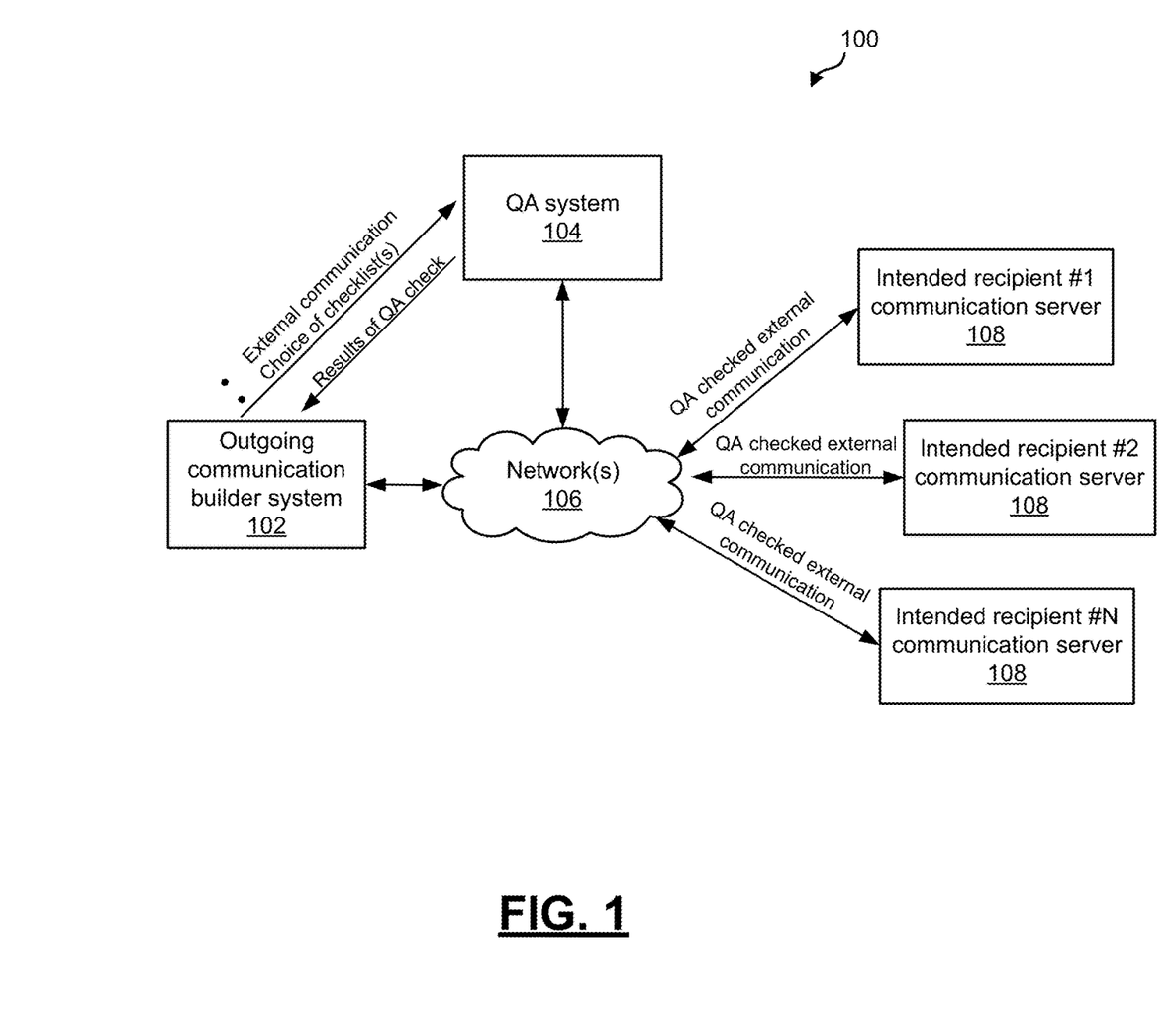
FIG. 1 is a block diagram depicting an example computing environment for building and deploying outgoing communications, in accordance with some embodiments.

FIG. 1 is a block diagram depicting an example computing environment 100 for building and deploying outgoing communications. The computing environment includes an outgoing communication builder system 102, a QA system 104, a network 106, and intended recipient communication servers 108. A user wishing to build an outgoing communication, such as a marketing campaign communication, can access a builder application accessible via the outgoing communication builder system 102 to build the outgoing communication. A marketing campaign may involve the deployment of hundreds or thousands (or more) of outgoing messages to end recipients. The builder application may be resident and executing on the outgoing communication builder system 102. Alternatively, the builder application may be resident and executing on a remote server and accessible to the outgoing communication builder system 102 over a network, for example, via a webpage and a web browser.

After designing an outgoing communication (or digital outbound communications), a user may access the QA system 104 over a network 106 to perform QA checks on the outgoing communication (or digital outbound communications) prior to sending the outgoing communications over the network 106 to intended recipients via intending recipient communication servers 108. The QA system 104 can be employed to check outgoing communication messages at the build phase, pre-deployment phase or both in an attempt to eliminate deployment errors that can result in the breach of compliance related regulations or cause brand related damage. During the build phase, a user may provide the external communication to the QA system 104 and optionally a selection of one or more checklists for use in performing a QA check on the external communication. During the pre-deployment phase, when the outgoing communication is in the process of being transmitted to the intended recipients, a communication server or other system associated with the outgoing communication builder system 102 for distributing the outgoing communication to the intended recipients may send the outgoing communication to the QA system 104 for QA checks prior to transmission.

The QA system 104 is configured to perform QA checks on the external communication using the rules provided in predetermined or identified checklists. The QA system 104 is also configured to return the results of the QA checks to the user. The QA system 104 may be built as a SaaS (Software as a Service) on a PaaS (Platform as a Service) and is configured to take in the format of an external communication (e.g., email, SMS, push notification or landing page, in either text-based or HTML format) and a set of rules parameters (for both predefined or configured wording or visual based rules), to execute a QA process by applying the rules, and record results in terms of pass/fail against each checklist item. The rules can be pre-defined (based on best practices, e.g., unsubscribe link is present, all alt tags are defined on images), or configurable (based on a specific organization's need), and can be designated as mandatory (i.e., the rule must pass before the external communication is allowed to go out) or optional. Rules can run based on text provided (e.g., "the text must or must not show up in the external communication"), Regular Expression (a.k.a. regex or regexp, a sequence of characters that define a search pattern), or fully programmable (i.e., run this programmable logic against the provided external communication and come back with a pass/fail and with a list of errors/warnings). A rule can also be a "visual rule" wherein an AI (artificial intelligence) system, such as Einstein Vision, is used to compare an image rendered in the external communication against a pre-determined image, and wherein any visual differences are highlighted for review.

The QA system 104 can have tight integration with builder applications accessible via the outgoing communication builder system 102, such as cloud-based products (e.g., the Salesforce Marketing Cloud, Sales Cloud, Service Cloud, Platform Cloud, Commerce Cloud, and others) making it appear that components of the QA system 104 are embedded within the cloud-based products. The example QA system 104 also includes an API interface that allows other applications that send external communications to connect to the QA system 104 for the performance of QA checks.

The example QA system 104 is configured to test digital outbound communications for end customers; configured for use by non-technical users with configurable rules, although it also allows users to implement more advanced rules; configured to use AI machine learning (e.g., Einstein Vision) to identify and highlight visual irregularities for users; configured to be used across many different cloud systems with outbound-communication function (e.g. Salesforce Marketing Cloud for emails, SMS, push notifications, landing pages; Salesforce CRM for emails, apex push notifications, Force.com (http://force.com/) sites or communities; Pardot for emails etc.); configured with an API interface to allow the example QA system to work with many different third party products; and configured to allow customer defined sets of rules that apply across all products that integrates with the example QA system for one centralized point of control for key outbound communications' rules to follow.

Figure 2:
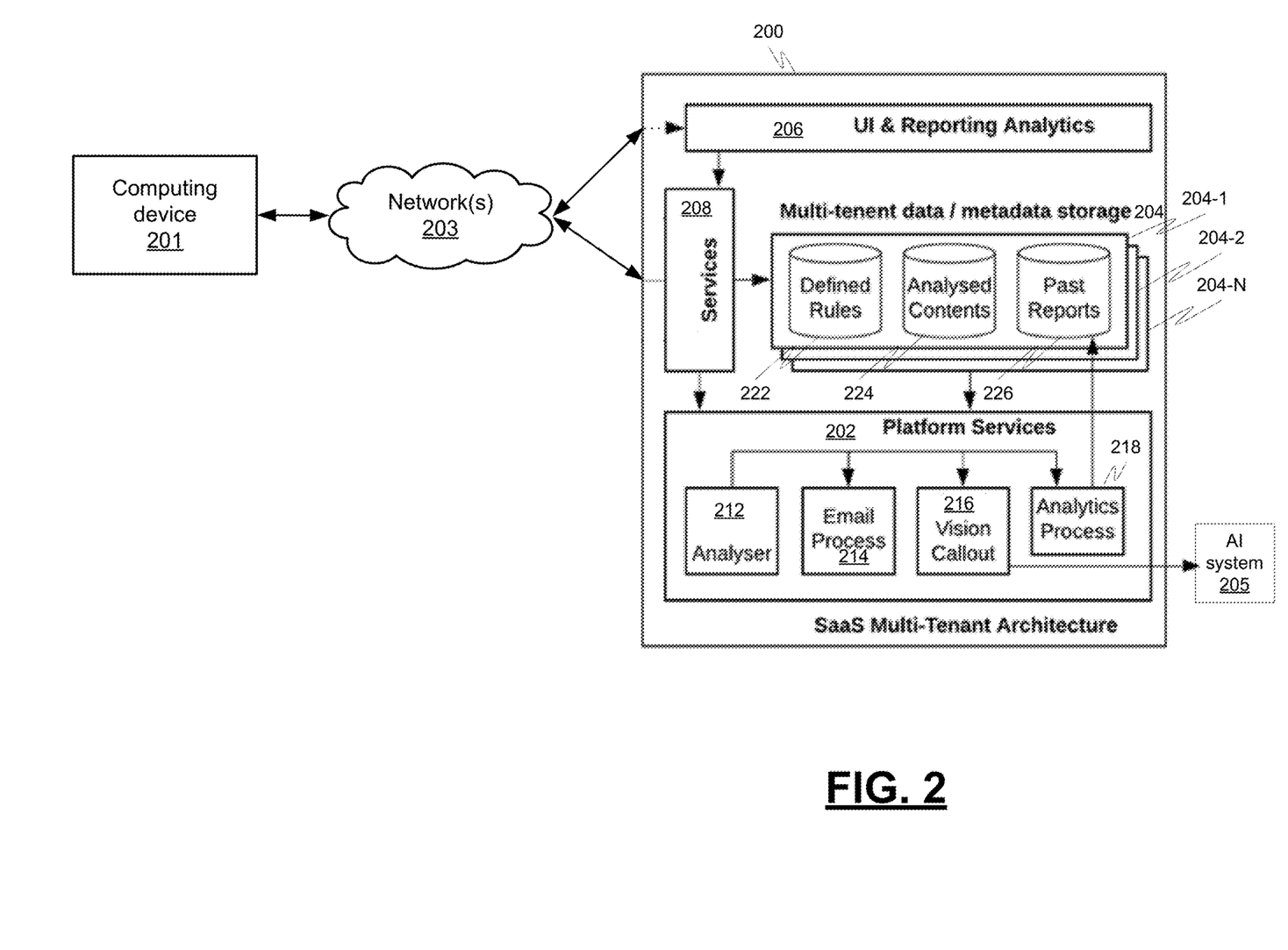
FIG. 2 is a block diagram depicting an example automated quality assurance system for automatically performing a quality assurance check on external communications, in accordance with some embodiments.

FIG. 2 is a block diagram depicting an example automated quality assurance system 200 for automatically performing a quality assurance check on external communications. The example quality assurance system 200 executes on a multi-tenant architecture. In other examples, the quality assurance system may execute on another type of server architecture. Generally speaking, multi-tenancy refers to a system where a single hardware and software platform simultaneously supports multiple user groups (also referred to as "organizations" or "tenants") from a common data storage element (also referred to as a "multi-tenant database"). Although multiple tenants may share access to a server and database, the particular data and services provided from the server and database to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data belonging to or otherwise associated with other tenants.

The example quality assurance system 200 is configured to receive an external communication from an executing application on a computing device 201 (e.g., outgoing communication builder system 102) received over a network 203. The external communication may be in the form of a digital message (such as an email, SMS, push data, external communication port, or other object that needs restrictive rules) and may include textual content and/or image content.

The example quality assurance system 200 is further configured to retrieve a predetermined set of rules applicable to the external communication, wherein the predetermined set of rules may include fixed rules, configurable rules and vision-based rules. The fixed rules may be pre-set for each user of the quality assurance system for the message type of the external communication, and the configurable rules may be configurable by a user of the quality assurance system for the message type of the external communication. Rules may be mandated by regulations or laws of governing authority (e.g., rule requiring an unsubscribe link, rule requiring a physical mailing address) or may be organization specific rules (e.g., use of specific font or background color). Rules may be applicable to textual aspects of the message (e.g., whether certain required text included) or visual aspects of the message (e.g., correct organizational logo used).

The example quality assurance system 200 is configured to determine if the external communication complies with each rule in the predetermine set of rules, wherein the set of predetermined rules may include mandatory rules that must be met and optional rules. The example quality assurance system 200 is further configured to provide feedback on compliance and/or non-compliance with the rules applicable to the external communication. The feedback may include a warning for each optional rule that is not met and an error message for each mandatory rule that is not met. Further, for mandatory rules not met, the example quality assurance system 200 may also provide an alert that the external communication may not be sent to intended recipients without error correction.

The example quality assurance system 200 comprises one or more processor(s) configured by programming instructions encoded in non-transient computer readable media, non-transient computer readable media, and storage elements such as disc drives. The processor(s) configured by programming instructions, non-transient computer readable media, and storage elements in the example quality assurance system 200 implement a platform services module 202, a multi-tenant data storage area 204, a user interface (UI) module 206, and an API (application program interface) services module 208.

The example platform services module 202 includes a rules analyzer module 212, a message process module 214, an AI (artificial intelligence) vision callout module 216, and an analytics process module 218. The example rules analyzer module 212 is configured to retrieve tenant-specific rules, understand the tenant-specific rules, and apply the tenant-specific rules to non-visual (e.g., textual and user-selected form fields) content in the external communications. The example rules analyzer module 212 is configured for use with tenant-specific content and tenant-specific rules for different tenants in the multi-tenant architecture.

The example message process module 214 is configured to send a message (e.g., email) to a tenant-specific administrator if something is wrong with the use by a tenant of the system. The example message process module 214 is configured for use with different tenants in the multi-tenant architecture.

The example AI vision callout module 216 is configured to be trained (e.g., using machine learning approach) to apply vision-based rules to graphical content in the external communications. As an example, the example AI vision callout module 216 is configured to be trained to perform image recognition operations to identify specific images (e.g., icons, logos, photos, or other types of images) that are allowed or not allowed to be used with external communications for a specific tenant. The example AI vision callout module 216 is configured for use with tenant-specific content and tenant-specific vision rules for different tenants in the multi-tenant architecture. The example AI vision callout module 216 is configured to work with an AI or machine learning system 205 (e.g., Salesforce's Einstein) to perform image recognition operations.

The example analytics process module 218 is configured to report various tenant-specific statistics associated with the use of the tool, such as how many or which email rules have been breached. The tenant-specific statistics may be stored in the tenant-specific storage space for the tenant within the multi-tenant data storage area 204. A tenant organization can access the tenant-specific statistics, which may identify whether any specific education is needed to ensure that best practices are followed by external communications generating users. The example analytics process module 218 is configured for use with different tenants in the multi-tenant architecture.

The example multi-tenant data storage area 204 in the multi-tenant architecture 200 provides, for each tenant, a tenant-specific storage area (204-1, 204-2, 204-N) for storing data relating to the tenant's use of the quality assurance system. Each tenant-specific storage area in the example multi-tenant data storage area 204 includes a defined rules storage area 222 for one or more sets of defined rules for external communications (e.g., set of defined rules for different message types, such as email, SMS); an analyzed content storage area 224 that includes external communications that have been analyzed by the system; and past reports storage area 226 that includes past analytical reports for the organization. Past reports may include periodic reports, statistics around how many emails have been scanned, which rules have been breached the most, which users are breaching certain rules on multiple content, identity of users who are recommended for additional training.

The example user interface (UI) module 206 is configured to provide a user interface for use by a user via a user computing device (e.g., outgoing communication builder system 102) to initiate quality assurance checking of external communications, select the checklist(s) to be used in performing the quality assurance checks, identify rules for each checklist, and receive feedback regarding the results of the quality assurance checks. The feedback may identify rules that were met, rules that were not met, the importance of the rule (e.g., whether the rule was an optional or mandatory rule), and providing a summary of results from the QA checks. The summary may include feedback in the form of a warning for each optional rule that is not met and an error message for each mandatory rule that is not met. The summary may include an indication of the number of rules out of the total rules that were met or an indication of the number of rules out of the total rules that were not met. The example UI module 206 may be further configured to report on output, trends, repeated user errors, or suggest training via an email message or some other form of communication.

The example API services module 208 provides an interface for external applications to interface with the UI 206, multi-tenant data storage 204, and platform services 202. The example API services module 208 provides an interface for allowing the system 200 to retrieve message contents for QA checks from an external application (e.g., executing on outgoing communication builder system 102), send analytics data to the external application, and provide a way to make it appear that the system 200 is embedded in the external application.

The external application may include an application for building external communications to be sent out. The external applications may include a messaging client for sending out external communications to intended recipients, such as an email server.

The example system 200 is configured to initiate a QA checking process responsive to receipt of a QA initiation request from an application for building outgoing communications. The QA initiation request may be transmitted in response to a selection of a clickable icon on the UI displayed to the user (e.g., via the outgoing communication builder system 102). This allows for QA checking to be performed during the build phase of an outgoing communication, wherein the build phase is a phase during which digital outbound communications are composed.

The example system 200 is also configured to initiate a QA checking process responsive to receipt of a QA initiation request from a messaging client. This allows for QA checking to be performed during a pre-deployment phase, wherein the pre-deployment phase is a phase during which the outgoing communication is submitted for transmission to its recipients (e.g., via email server wherein the email server flags and blocks email violating rules from transmission, e.g., to prevent violation of spam rules).

Figure 3:
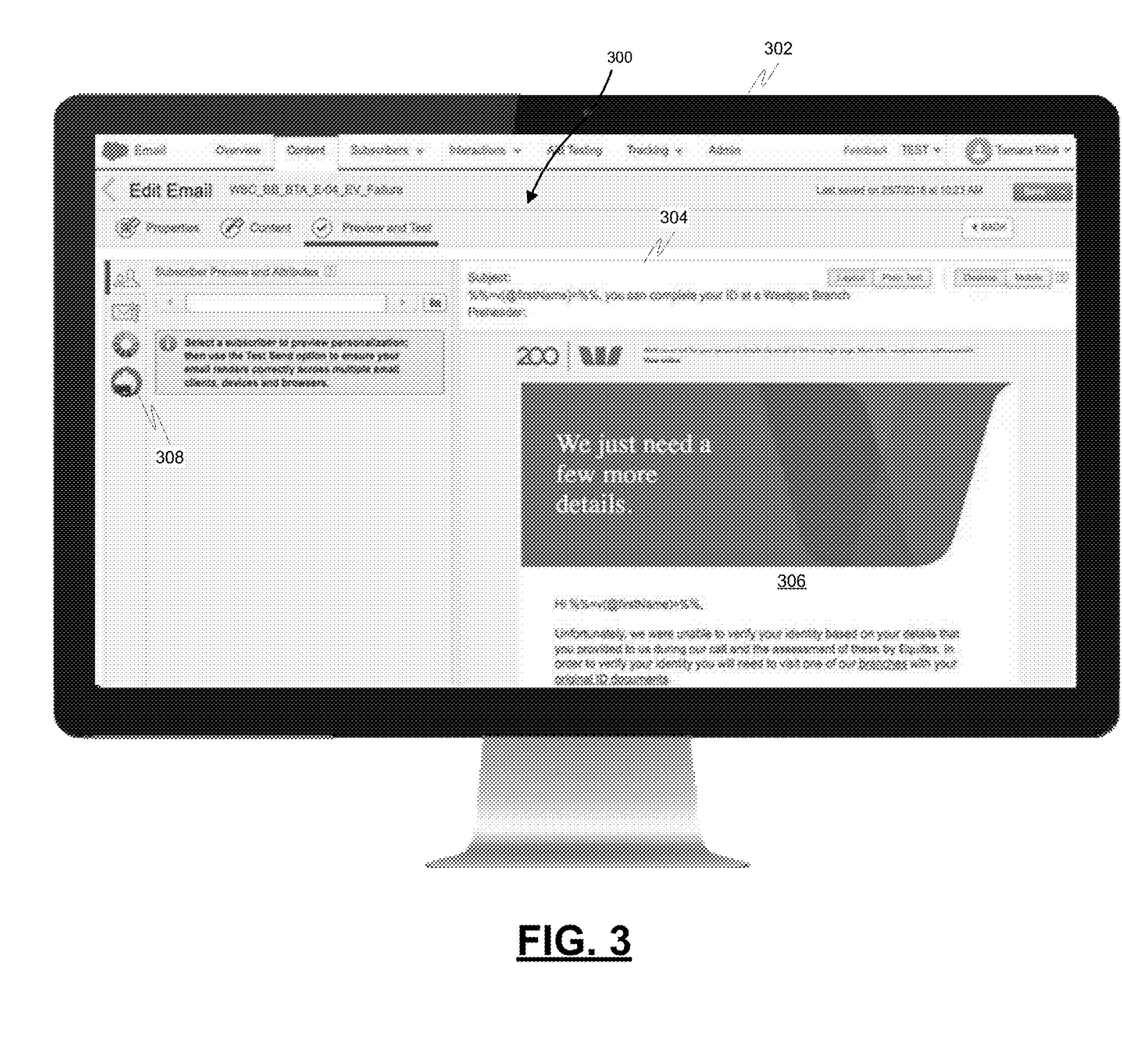
FIG. 3 is a diagram depicting an example screenshot of a user interface in an example system for building an email for a marketing campaign, in accordance with some embodiments.

FIG. 3 is a diagram depicting an example screenshot of a user interface 300 in an example system 302 for building an email for a marketing campaign. The user interface 300 includes a pane 304 for displaying an external communication 306 being built and an icon 308 built into the user interface that when selected causes the external communication 306 to be sent to the QA system for QA checking.

Figure 4:
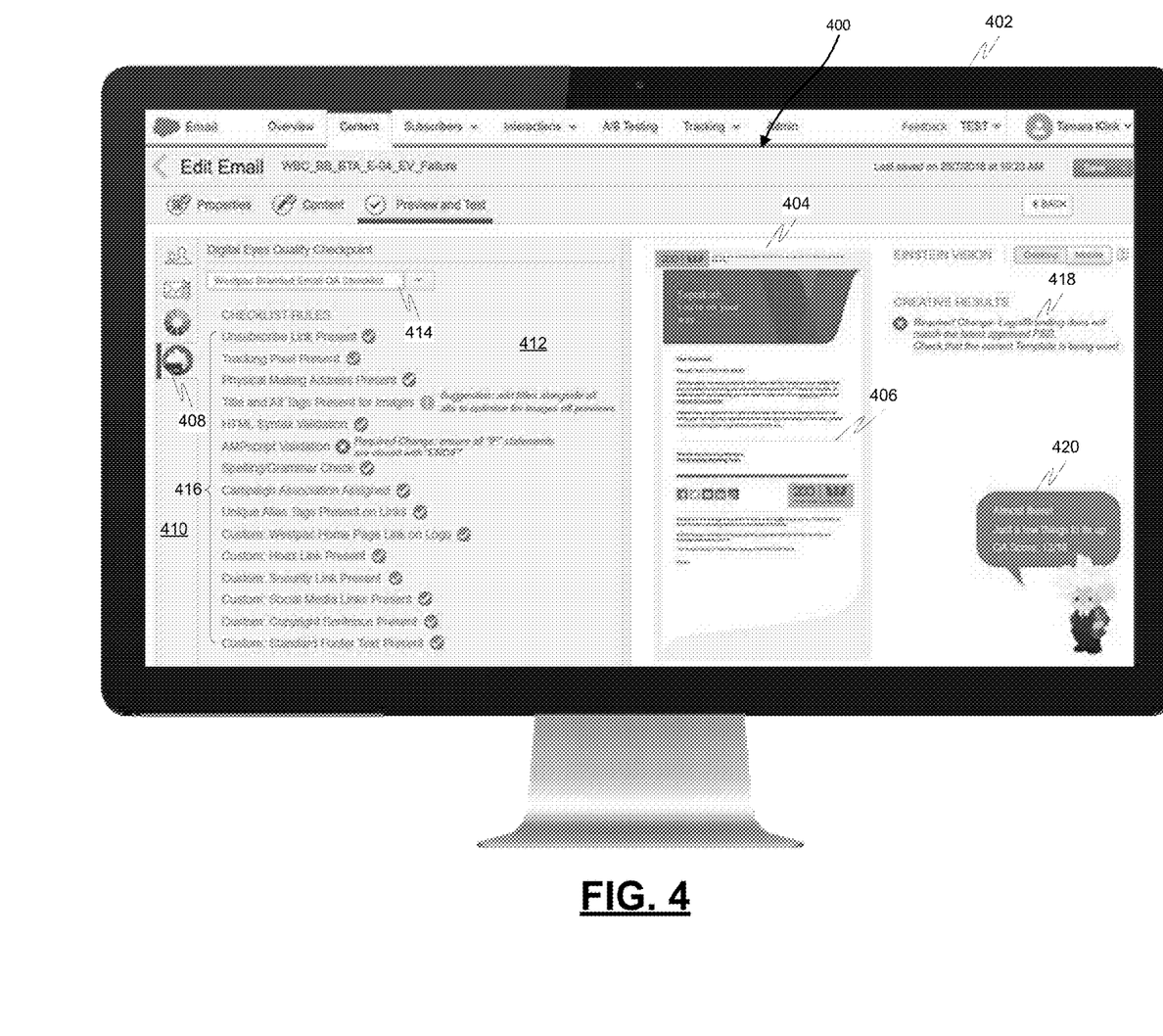
FIG. 4 is a diagram depicting an example screenshot of a user interface in an example system for building an email for a marketing campaign after automated quality assurance has been initiated, in accordance with some embodiments.

FIG. 4 is a diagram depicting an example screenshot of a user interface 400 in an example system 402 for building an email for a marketing campaign after automated quality assurance has been initiated. The user interface 400 includes a right pane 404 for displaying an external communication 406 being built and an icon 408 built into a left panel 410 of a left pane 412 of the user interface 400 that when selected causes the external communication 406 to be sent to the QA system for QA checking. Depicted in the left pane 412 is checklist selection widget 414 through which a user can select a checklist for the QA system to apply to the external communication 406. Also depicted in the left pane 412 are checklist rules 416 for the selected checklist. After the QA system performs QA checking, the QA system updates the left pane 412 with an indication regarding whether the rules were passed or failed. In this example, a "checkmark icon" indicates that a rule was passed, an "X" indicates that a mandatory rule failed (hint is also provided for help in fixing error), and a "!" indicates that an optional rule was not passed (hint is also provided for help in fixing error). The QA system also updates the right pane 404 with an indication regarding whether rules were passed or failed. In this example, an AI vision section provides an indication 418 of an incorrect logo use. Also, a summary indication 420 is provided that identifies the number of correctly followed rules out of the total number of rules checked. In this example, the UI module in the QA system created the content for display on the user system 402 showing results of the QA checking.

Figure 5:
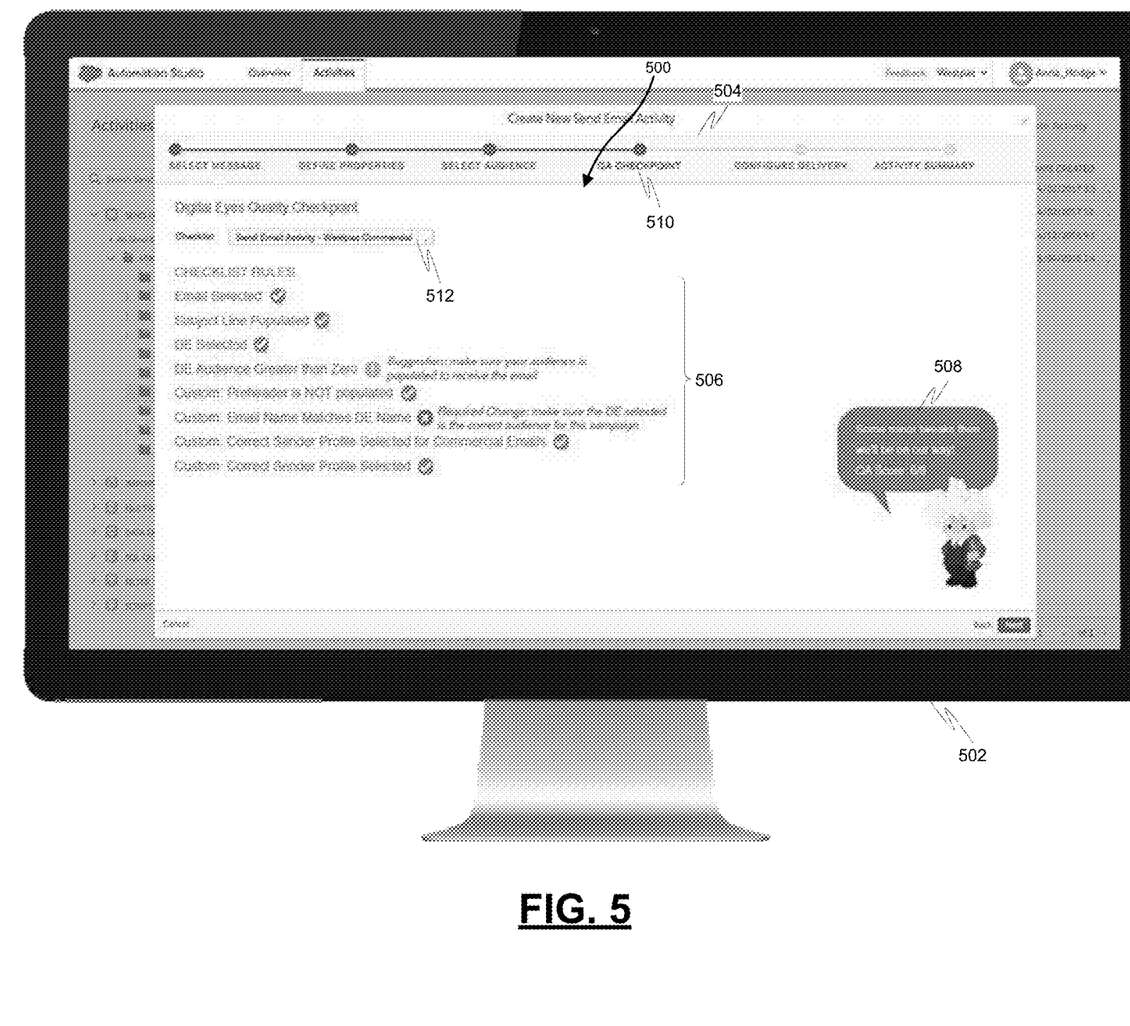
FIG. 5 is a diagram depicting an example screenshot of a user interface in an example system for building a Send Activity Configuration for an email campaign after automated quality assurance has been performed during a checkpoint in the wizard/workflow, in accordance with some embodiments.

FIG. 5 is a diagram depicting an example screenshot of a user interface 500 in an example system 502 for building a Send Activity Configuration for an email campaign after automated quality assurance has been performed during a checkpoint in the wizard/workflow. In this example, automated quality assurance has been performed during the pre-deployment phase of the marketing campaign. In this example, a window 504 has been generated by the UI module in the QA system for display on the system 502 during the pre-deployment phase. The example window 504 provides the checklist rules 506 and an indication regarding whether the rules were passed or failed. In this example, a "checkmark icon" indicates that a rule was passed, an "X" indicates that a mandatory rule failed (hint is also provided for help in fixing error), and a "!" indicates that an optional rule was not passed (hint is also provided for help in fixing error). Also, a summary indication 508 is provided that identifies the number of correctly followed rules out of the total number of rules checked. QA Checkpoint 510 appears to quality check previous steps taken to configure Email Send Activity items. Also depicted is a checklist selection widget 512 that is used to select a checklist based on the type of communication that has been configured.

Figure 6:
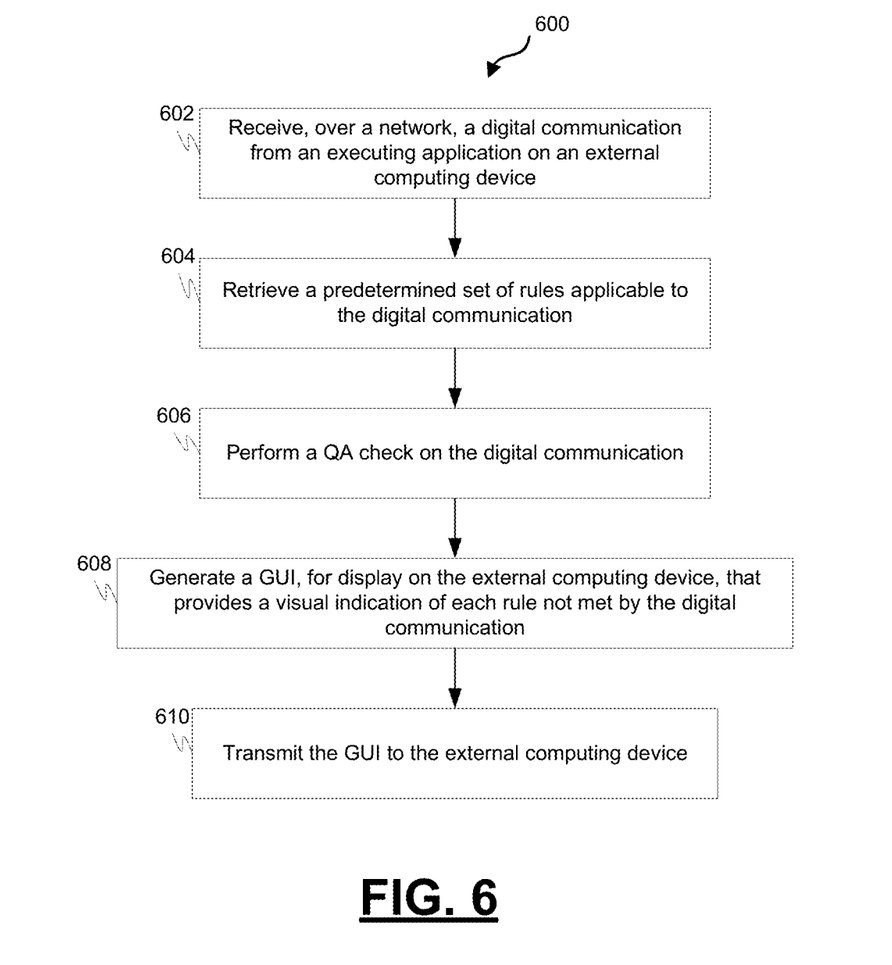
FIG. 6 is a process flow chart depicting an example process in an example automated quality assurance system, in accordance with some embodiments.

FIG. 6 is a process flow chart depicting an example process 500 in an example automated quality assurance system. The order of operation within the example process 500 is not limited to the sequential execution as illustrated in the figure, but may be performed in one or more varying orders as applicable and in accordance with the present disclosure.

The example process includes receiving, over a network, a digital communication (which can be a template from the build phase, or an actual instance of the outgoing communication during the pre-deployment phase) from an executing application on an external computing device (operation 602). The example process includes retrieving a predetermined set of rules applicable to the digital communication (operation 604).

The example process includes performing a QA check on the digital communication (operation 606). Performing a QA check on the digital communication includes determining whether the digital communication complies with each rule in the predetermined set of rules. The set of predetermined rules may include both mandatory rules that must be met and optional rules. The set of predetermined rules may also include text-based rules and vision-based rules. The text-based rules may include a rule requiring the inclusion of specific text or a rule requiring the exclusion of specific text. The visual-based rules may include a rule identifying a specific graphical item to be included in the digital communication or a rule identifying a specific graphical item to be excluded from the digital communication. The graphical item may be a specific icon, symbol, logo, photo, or other graphical object or image. Performing a QA check may include performing the QA check during a build phase of an outgoing communication, wherein the build phase is a phase during which an outgoing communication is composed. Performing a QA check may include performing the QA check during a pre-deployment phase, wherein the pre-deployment phase is a phase during which the outgoing communication is configured for transmission to its recipients.

The example process includes generating a graphical user interface (GUI), for display on the external computing device, that provides a visual indication of each rule not met by the digital communication (operation 608). The example process includes transmitting the GUI to the external computing device (operation 610).

Figure 7:
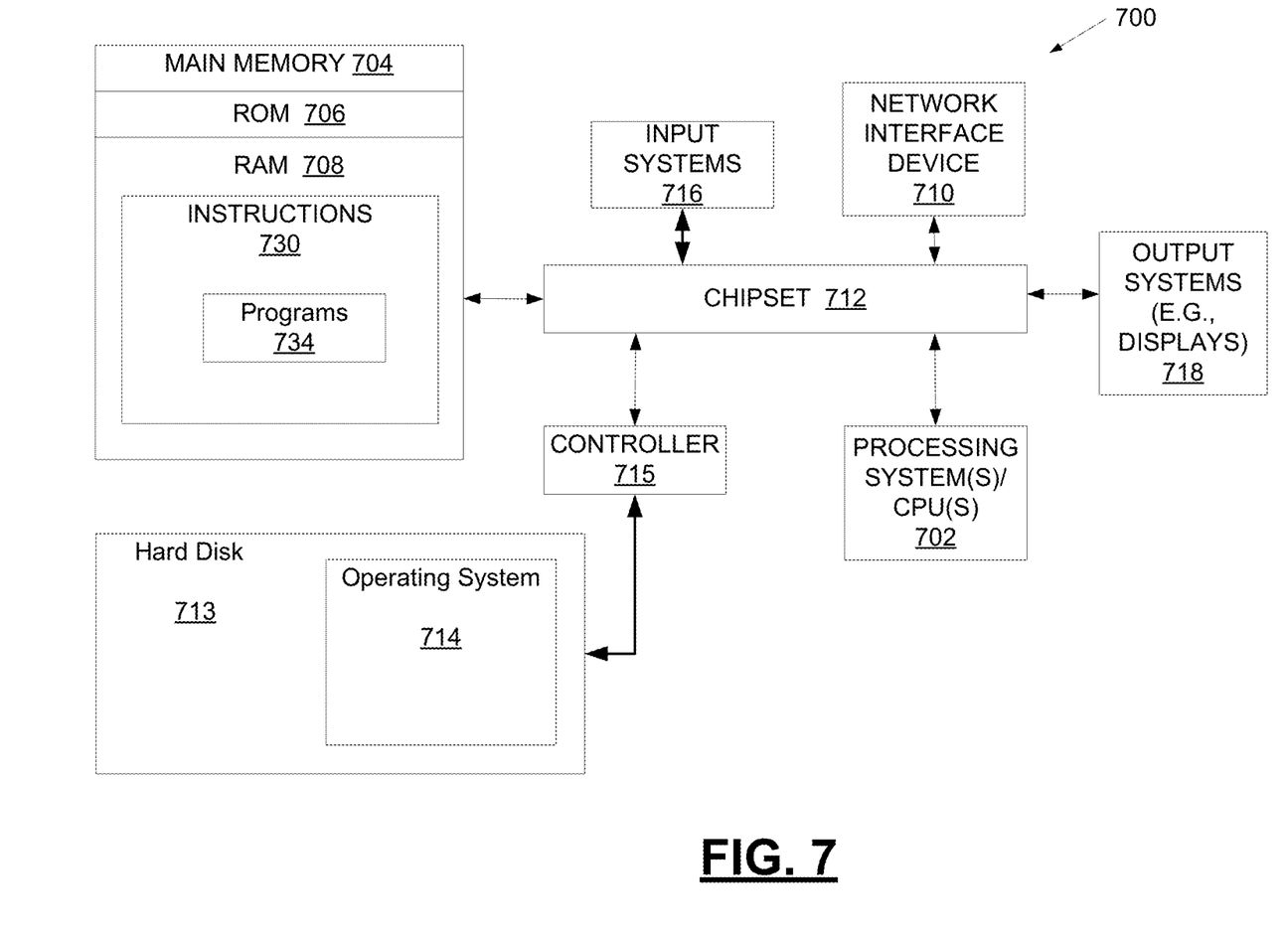
FIG. 7 is a schematic block diagram of an example computer system that can be used to implement the techniques and methods described herein, in accordance with some embodiments.

FIG. 7 is a schematic block diagram of an example computer system that can be used to implement the techniques and methods described herein. The example computer system can include one or more processing system(s) 702, main memory 704, a network interface device (NID) 710, a chipset 712, a hard disk 713 and hard disk controller 715, input systems 716, and output systems 718.

The chipset 712 is usually located on a motherboard and is a set of electronic components (e.g., in an integrated circuit) that interconnects and manages the data flow between the processing system(s) 702 and other elements of the computer system and connected peripherals. For instance, the chipset 712 provides an interface between the processing system(s) 702 and the main memory 704, and also includes functionality for providing network connectivity through the NID 710, such as a gigabit Ethernet adapter. The chipset 712 typically contains the processor bus interface (also known as a front-side bus), memory controllers, bus controllers, I/O controllers, etc.

Processing system(s) 702 represents one or more general-purpose processing devices such as a microprocessor, central processing unit, or the like. More particularly, the processing system(s) 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 702 may also be one or more special-purpose processing devices such as an application specific integrated circuit (ASIC), a field programmable gate array (FPGA), a digital signal processor (DSP), network processor, or the like.

The processing system(s) 702 can include one or more central processing units (CPUs) that operate in conjunction with the chipset 712. The processing system(s) 702 perform arithmetic and logical operations necessary for the operation of the example computer system.

The NID 710 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 716 (or input device(s)) allow a user to input information to the computer system and can include things such as a keyboard, a mouse or other cursor pointing device, a pen, a voice input device, a touch input device, a webcam device, a microphone, etc. Output system(s) 718 (or output device(s)) present information to the user of the computer system and can include things such as a display, monitor, speakers, or the like.

The chipset 712 can provide an interface to various forms of computer-readable storage media including a main memory 704 (e.g., read-only memory (ROM), flash memory, dynamic random access memory (DRAM) such as synchronous DRAM (SDRAM)), and hard disk 713. The processing system(s) 702 can communicate with the various forms of computer-readable storage media via the chipset 712 and appropriate buses.

A hard disk 713 is a form of non-volatile memory that can store an operating system (OS) 714. The operating system 714 is software that is copied into RAM and executed by the processing system(s) 702 to control the operation of the example computer system, manage computer hardware and software resources, and provide common services for computer programs executed by the processing system(s) 702. Regardless of the implementation, the operating system 714 includes many different "components" that make the different parts of the example computer system work together. The disk controller 715 is the controller circuit which enables the processing system 702 to communicate with a hard disk 713, and provides an interface between the hard disk 713 and the bus connecting it to the rest of the system.

The main memory 704 may be composed of many different types of memory components. The main memory 704 can include non-volatile memory (such as read-only memory (ROM) 706, flash memory, etc.), volatile memory (such as random access memory (RAM) 708), or some combination of the two. The RAM 708 can be any type of suitable random access memory including the various types of dynamic random access memory (DRAM) such as SDRAM, the various types of static RAM (SRAM). The main memory 704 (as well as the processing system(s) 702) may be distributed throughout the example computer system.

The ROM 706 of the main memory 704 can be used to store firmware that includes program code containing the basic routines that help to start up the example computer system and to transfer information between elements within the example computer system. The ROM of the main memory 704 may also store other software components necessary for the operation of the example computer system.

The RAM 708 stores programs/instructions 730 or executable code for one or more programs 734 that can be loaded and executed at processing system(s) 702 to perform various functions. The programs/instructions 730 are computer readable program code that can be stored in RAM 708 (or other a non-transitory computer readable medium of the example computer system) that can be read and executed by processing system(s) 702 to perform various acts, tasks, functions, and steps as described herein. The methods and techniques described herein can be captured in programming instructions 730 for execution by the processing system 702 to cause the example computer system to perform the described methods, processes, and techniques.

In one embodiment, a quality assurance (QA) system for automatically performing a quality assurance check on digital communication is provided. The QA system comprises a processor configured by programming instructions encoded on non-transient computer readable media. The QA system is configured to: receive, by the processor over a network, a digital communication from an executing application on an external computing device; retrieve, by the processor, a predetermined set of rules applicable to the digital communication; and perform, by the processor, a QA check on the digital communication by determining whether the digital communication complies with each rule in the predetermined set of rules. The set of predetermined rules includes mandatory rules that must be met and optional rules. The set of predetermined rules also includes text-based rules and vision-based rules. The text-based rules include a rule requiring the inclusion of specific text or a rule requiring the exclusion of specific text. The visual-based rules include a rule identifying one or more specific graphical item(s) to be included in the digital communication or a rule identifying one or more specific graphical item(s) to be excluded from the digital communication. The QA system is further configured to: generate, by the processor, a graphical user interface (GUI), for display on the external computing device, that provides a visual indication of each mandatory rule not met by the digital communication and a visual indication of each optional rule not met by the digital communication; and transmit the GUI to the external computing device over the network.

These aspects and other embodiments may include one or more of the following features. The QA system may be further configured to execute on a multi-tenant architecture, and may comprise a platform services module configured to perform QA tasks on tenant-specific data for multiple tenants. The platform services module may comprise: an analyzer module configured to apply tenant-specific text-based rules to textual content in the digital communication from a specific tenant of the multi-tenant architecture; and an artificial intelligence (AI) vision callout module configured to apply tenant-specific vision-based rules to graphical content in the digital communication from the specific tenant. The graphical content may comprise a logo, icon, or other visual element. The multi-tenant architecture may include a multi-tenant data storage area that provides a tenant-specific storage area for each tenant that uses the QA system for storing data relating to the use by the tenant of the QA system. The analyzer module and AI vision callout module may be configured to retrieve the tenant-specific rules for the specific tenant from a tenant-specific defined rules storage area in the tenant-specific storage area for the specific tenant. The QA system may further comprise a UI module configured to generate, for each tenant that uses the QA system, the GUI for display on the external computing device. The executing application may comprise an application for building outgoing digital communications, and the QA system may be further configured to initiate the performance of a QA check on the digital communication responsive to receipt of a QA initiation request from the application for building outgoing digital communications, wherein the QA check is performed during a build phase of the digital communication, wherein the build phase is a phase during which the digital communication is composed. The QA initiation request may be responsive to a selection of a clickable icon or step in a workflow/wizard on the GUI for display on the external computing device or prompted via a checkpoint. The executing application may comprise a message output server, and the QA system may be further configured to initiate the performance of a QA check on the digital communication responsive to receipt of the digital communication from the message output server, wherein the QA check is performed at a pre-deployment phase, wherein the pre-deployment phase is a phase prior to the digital communication is submitted for transmission to its recipients. The digital communication may comprise an email message, as SMS message, push data, a digital version of a to-be-printed-and-snail-mail-delivered physical mail, or other types of communication such as a reply/comment/post on social media, blog, site, or community forum. The UI module may be further configured to report on output, trends, repeated user errors, or suggest training via an email message.

In another embodiment, a multi-tenant system that implements a quality assurance (QA) system for automatically performing a quality assurance check on digital communication is provided. The multi-tenant system comprises a multi-tenant data storage area; a platform services module; and a UI module. The multi-tenant data storage area comprises data storage media and is configured to provide a tenant-specific storage area for each tenant that uses the QA system for storing data relating to the use by the tenant of the QA system. The platform services module comprises a processor configured by programming instructions encoded on non-transient computer readable media. The platform services module is configured to: retrieve, by the processor, a predetermined set of rules applicable to the digital communication; and perform, by the processor, a QA check on a digital communication from an executing application on an external computing device received over a network. The platform services module is configured to perform the QA check by determining whether the digital communication complies with each rule in the predetermined set of rules, wherein the set of predetermined rules includes mandatory rules that must be met and/or optional rules. The set of predetermined rules also includes text-based rules and vision-based rules, wherein the text-based rules include a rule requiring the inclusion of specific text or a rule requiring the exclusion of specific text, and wherein the visual-based rules include a rule identifying a specific graphical item to be included in the digital communication or a rule identifying a specific graphical item to be excluded from the digital communication. The UI module comprises a processor configured by programming instructions encoded on non-transient computer readable media. The UI module is configured to: receive, by the processor, the digital communication from the executing application on the external computing device; generate, by the processor, a graphical user interface (GUI) for display on the external computing device that provides a visual indication of each mandatory rule not met by the digital communication and a visual indication of each optional rule not met by the digital communication; and transmit the GUI to the external computing device over the network.

These aspects and other embodiments may include one or more of the following features. The UI module may be further configured to report on output, trends, repeated user errors, or suggest training. The platform services module may comprise: an analyzer module configured to apply tenant-specific textual rules to textual content in the digital communication from a specific tenant of the multi-tenant architecture; and an artificial intelligence (AI) vision callout module configured to apply vision-based rules to graphical content in the digital communication from the specific tenant. The analyzer module and AI vision callout module may be configured to retrieve the tenant-specific rules for the specific tenant from a tenant-specific defined rules storage area in the tenant-specific storage area for the specific tenant. The executing application may comprise an application for building outgoing digital communications, and the system may be further configured to initiate the performance of a QA check on the digital communication responsive to receipt of a QA initiation request from the application for building outgoing digital communications, wherein the QA check is performed during a build phase of the digital communication, and wherein the build phase is a phase during which the digital communication is composed. The executing application may comprise a message output server, and the system may be further configured to initiate the performance of a QA check on the digital communication responsive to receipt of the digital communication from the message output server, wherein the QA check is performed at a pre-deployment phase, and wherein the pre-deployment phase is a phase during which the digital communication is submitted for transmission to its recipients.

In another embodiment, a processor-implemented method for automatically performing a quality assurance check on digital communication comprises: receiving, by a processor over a network, a digital communication from an executing application on an external computing device; retrieving, by the processor, a predetermined set of rules applicable to the digital communication; and performing, by the processor, a QA check on the digital communication by determining whether the digital communication complies with each rule in the predetermined set of rules. The set of predetermined rules include mandatory rules that must be met and optional rules. The set of predetermined rules also include text-based rules and vision-based rules, wherein the text-based rules include a rule requiring the inclusion of specific text or a rule requiring the exclusion of specific text, and wherein the visual-based rules include a rule identifying a specific graphical item to be included in the digital communication or a rule identifying a specific graphical item to be excluded from the digital communication. The method further comprises: generating, by the processor, a graphical user interface (GUI), for display on the external computing device, that provides a visual indication of each mandatory rule not met by the digital communication and a visual indication of each optional rule not met by the digital communication; and transmitting the GUI to the external computing device.

These aspects and other embodiments may include one or more of the following features. Performing a QA check may comprise performing the QA check during a build phase of an outgoing digital communication, wherein the build phase is a phase during which an outgoing digital communication is composed. Performing a QA check may comprise performing the QA check during a pre-deployment phase, wherein the pre-deployment phase is a phase during which the outgoing digital communication is submitted for transmission to its recipients.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A quality assurance (QA) system in a server architecture that allows different sets of tenants to share functionality and hardware resources without sharing data belonging to or otherwise associated with other tenants, the QA system for automatically performing a quality assurance check on tenant-specific digital communication using tenant-specific rules, the quality assurance system comprising a processor configured by programming instructions encoded on non-transitory computer readable media, the quality assurance system configured to:

store in data storage in the server architecture a plurality of sets of tenant-specific rules including a first set of tenant-specific rules, wherein the first set of tenant-specific rules are applicable to communications by users in a first tenant domain but not applicable to users in a second tenant domain and includes a first tenant-specific visual-based rule requiring that a specific, non-textual, graphical item identified for the first tenant domain be included in the communications by the users in the first tenant domain;

train a first tenant-specific artificial intelligence (AI) module using a machine learning approach to perform image recognition operations and determine whether an image complies with the first tenant-specific visual-based rule;

receive, over a network, a first digital communication generated from an executing application on an external computing device operated by a first user in the first tenant domain;

retrieve the first set of tenant-specific rules from the data storage that includes the first tenant-specific visual-based rule responsive to receiving the first digital communication;

apply the first tenant-specific visual-based rule to the first digital communication using the first tenant-specific AI module;

identify by the first tenant-specific AI module, based on applying the first tenant-specific visual-based rule to the first digital communication, whether a specific image in the first digital communication complied with or did not comply with the first tenant-specific visual-based rule;

generate at least one graphical element that visually indicates whether the first digital communication complied with or did not comply with the first tenant-specific visual-based rule requiring that a specific, non-textual, graphical item identified for the first tenant domain be included; and signal the external computing device to display the at least one graphical element in a graphical user interface (GUI) on the external computing device.

2. The QA system of claim 1, further configured to execute on a multi-tenant architecture, and comprising a platform services module configured to perform QA tasks on tenant-specific data for multiple tenants.

3. The QA system of claim 2, wherein the platform services module comprises:

an analyzer module configured to apply tenant-specific text-based rules to textual content in the digital communication from a specific tenant of the multi-tenant architecture; and an artificial intelligence (AI) vision callout module configured to apply tenant-specific vision-based rules to graphical content in the digital communication from the specific tenant.

4. The QA system of claim 3, wherein the graphical content comprises a logo, icon, or other visual element.

5. The QA system of claim 3, wherein the multi-tenant architecture includes a multi-tenant data storage area that provides a tenant-specific storage area for each tenant that uses the QA system for storing data relating to the use by the tenant of the QA system.

6. The QA system of claim 5, wherein the analyzer module and AI vision callout module are configured to retrieve the tenant-specific rules for the specific tenant from a tenant-specific defined rules storage area in the tenant-specific storage area for the specific tenant.

7. The QA system of claim 2, further comprising a UI module configured to generate, for each tenant that uses the QA system, the GUI for display on the external computing device.

8. The QA system of claim 1, wherein the executing application comprises an application for building outgoing digital communications, and the QA system is further configured to initiate the generating the at least one graphical element responsive to receipt of a QA initiation request from the application for building outgoing digital communications, wherein the generating the at least one graphical element is performed during a build phase of the digital communication, wherein the build phase is a phase during which the digital communication is composed.

9. The QA system of claim 8, wherein the QA initiation request is responsive to a selection of a clickable icon or step in a workflow/wizard on the GUI for display on the external computing device.

10. The QA system of claim 1, wherein the executing application comprises a message output server, and the QA system is further configured to initiate the generating the at least one graphical element responsive to receipt of the digital communication from the message output server, wherein the generating the at least one graphical element is performed at a pre-deployment phase, wherein the pre-deployment phase is a phase during which the digital communication is submitted for transmission to its recipients.

11. The QA system of claim 1, wherein the digital communication comprises an email message, an SMS message, push data, or a digital version of a to-be-printed-and-snail-mail-delivered physical mail.

12. The QA system of claim 7, wherein the UI module is further configured to report on output, trends, repeated user errors, or suggest training via an email message.

13. A multi-tenant system that allows different sets of tenants to share functionality and hardware resources without sharing data belonging to or otherwise associated with other tenants and implements a quality assurance (QA) system for automatically performing a quality assurance check on tenant-specific digital communication using tenant-specific rules, the multi-tenant system comprising:

a multi-tenant data storage area comprising data storage media and configured to provide a tenant-specific storage area for each tenant that uses the QA system for storing data relating to the use by the tenant of the QA system;

a platform services module comprising a processor configured by programming instructions encoded on non-transitory computer readable media, the platform services module configured to:

store in the multi-tenant data storage area a plurality of sets of tenant-specific rules including a first set of tenant-specific rules, wherein the first set of tenant-specific rules are applicable to communications by users in a first tenant domain but not applicable to users in a second tenant domain and includes a first tenant-specific visual-based rule requiring that a specific, non-textual, graphical item identified for the first tenant domain be included in the communications by the users in the first tenant domain train a first tenant-specific artificial intelligence (AI) module using a machine learning approach to perform image recognition operations and determine whether an image complies with the first tenant-specific visual-based rule;

receive, over a network, a first digital communication generated from an executing application on an external computing device operated by a first user in the first tenant domain;

retrieve the first set of tenant-specific rules from the multi-tenant data storage area that includes the first tenant-specific visual-based rule responsive to receiving the first digital communication; and apply the first tenant-specific visual-based rule to the first digital communication using the first tenant-specific AI module; and a UI module comprising a processor configured by programming instructions encoded on non-transitory computer readable media, the UI module configured to:

receive the digital communication from the executing application on the external computing device operated by the first tenant;

generate at least one graphical element that visually indicates whether the first digital communication complied with or did not comply with the first tenant-specific visual-based rule requiring that a specific, non-textual, graphical item identified for the first tenant domain be included; and signal the external computing device to display the at least one graphical element in a graphical user interface (GUI) on the external computing device.

14. The multi-tenant system of claim 13, wherein the platform services module comprises:

an analyzer module configured to apply tenant-specific textual rules to textual content in the digital communication from a specific tenant of the multi-tenant system; and an artificial intelligence (AI) vision callout module configured to apply tenant-specific vision-based rules to graphical content in the digital communication from the specific tenant.

15. The multi-tenant system of claim 14, wherein the analyzer module and AI vision callout module are configured to retrieve the tenant-specific rules for the specific tenant from a tenant-specific defined rules storage area in the tenant-specific storage area for the specific tenant.

16. The multi-tenant system of claim 13, wherein the executing application comprises an application for building outgoing digital communications, and the system is further configured to initiate the generating the at least one graphical element responsive to receipt of a QA initiation request from the application for building outgoing digital communications, wherein the generating the at least one graphical element is performed during a build phase of the digital communication, wherein the build phase is a phase during which the digital communication is composed.

17. The multi-tenant system of claim 13, wherein the executing application comprises a message output server, and the system is further configured to initiate the generating the at least one graphical element responsive to receipt of the digital communication from the message output server, wherein the generating the at least one graphical element is performed at a pre-deployment phase, wherein the pre-deployment phase is a phase during which the digital communication is submitted for transmission to its recipients.

18. A processor-implemented method, in a server architecture that allows different sets of tenants to share functionality and hardware resources without sharing data belonging to or otherwise associated with other tenants, for automatically performing a quality assurance check on tenant-specific digital communication using tenant-specific rules, the method comprising:

storing in data storage in the server architecture a plurality of sets of tenant-specific rules including a first set of tenant-specific rules, wherein the first set of tenant-specific rules are applicable to communications by users in a first tenant domain but not applicable to users in a second tenant domain and includes a first tenant-specific visual-based rule requiring that a specific, non-textual, graphical item identified for the first tenant domain be included in the communications by the users in the first tenant domain;

training a first tenant-specific artificial intelligence (AI) module using a machine learning approach to perform image recognition operations and determine whether an image complies with the first tenant-specific visual-based rule;

receiving, over a network, a first digital communication generated from an executing application on an external computing device operated by a first user in the first tenant domain;

retrieving the first set of tenant-specific rules from the data storage that includes the first tenant-specific visual-based rule responsive to receiving the first digital communication;

applying first tenant-specific visual-based rule to the first digital communication using the first tenant-specific AI module;

identifying by the first tenant-specific AI module, based on applying the first tenant-specific visual-based rule to the first digital communication, whether a specific images in the first digital communication complied with or did not comply with the first tenant-specific visual-based rule;

generating at least one graphical element that visually indicates whether the first digital communication complied with or did not comply with the first tenant-specific visual-based rule requiring that a specific, non-textual, graphical item identified for the first tenant domain be included; and signaling the external computing device to display the at least one graphical element in a graphical user interface (GUI) on the external computing device.

19. The method of claim 18, wherein generating at least one graphical element comprises generating the at least one graphical element during a build phase of an outgoing digital communication, wherein the build phase is a phase during which an outgoing digital communication is composed.

20. The method of claim 18, wherein generating at least one graphical element comprises generating the at least one graphical element during a pre-deployment phase, wherein the pre-deployment phase is a phase during which an outgoing digital communication is submitted for transmission to its recipients.

\* \* \* \* \*